July 26, 1932.   C. B. SPASE   1,868,675
CLUTCH SERVICING FIXTURE
Filed Nov. 27, 1931   2 Sheets-Sheet 1

INVENTOR.
Charles B. Spase
BY
Fay, Oberlin + Fay
ATTORNEYS.

July 26, 1932.  C. B. SPASE  1,868,675
CLUTCH SERVICING FIXTURE
Filed Nov. 27, 1931  2 Sheets-Sheet 2
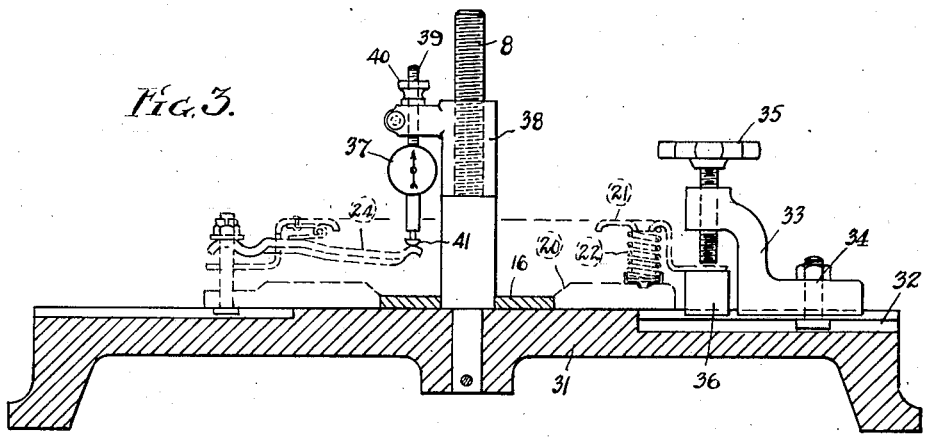
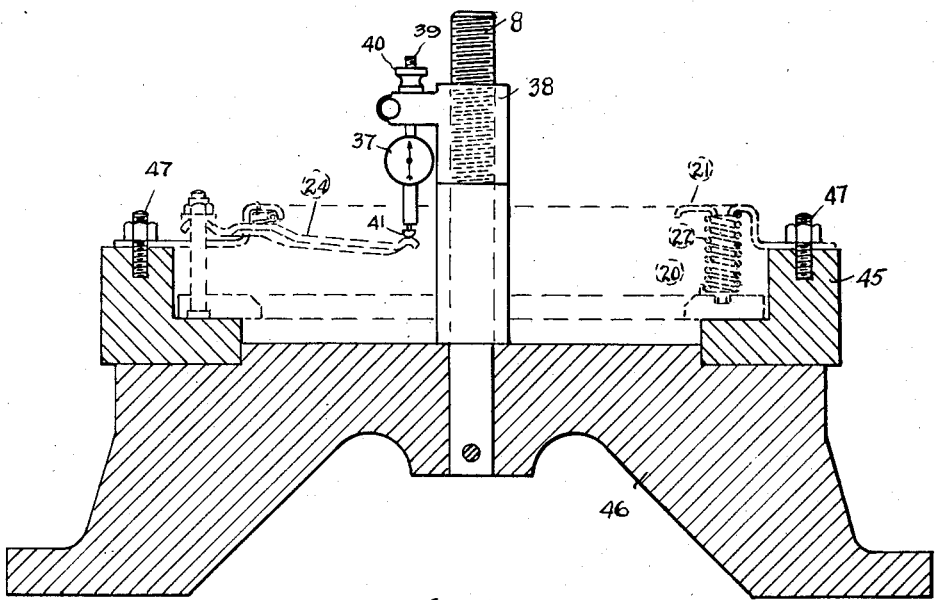
INVENTOR.
Charles B. Spase
BY
Fay, Oberlin & Fay
ATTORNEYS.

Patented July 26, 1932

1,868,675

UNITED STATES PATENT OFFICE

CHARLES B. SPASE, OF SYRACUSE, NEW YORK, ASSIGNOR TO IRA SAKS, OF CLEVELAND, OHIO

CLUTCH SERVICING FIXTURE

Application filed November 27, 1931. Serial No. 577,481.

The present invention, relating, as indicated, to a clutch servicing fixture, has more particular reference to a device for assembling, adjusting and disassembling that type of automotive clutch which possesses circumferentially disposed pressure springs and radially extending actuating levers. It is well known in the art that in automotive friction clutches the action of the parts which intermittently transmit the driving torque must contact evenly with each other in order to produce a smooth and non-vibrational engagement. The proper adjustment and alinement of the actuating parts of a friction clutch assembly are therefore of paramount importance and in the past has been accomplished only in the initial assembly at the factory which makes the unit. No provision is made for subsequent proper servicing of these assemblies.

It is the general object and nature of my present invention to provide a compact portable and accurate fixture for use in servicing automotive clutches which shall be capable of rapidly and precisely facilitating the assembly and adjustment of such clutch parts. Briefly outlined, my device consists of a base plate, a clamping plate or spider, and a hand wheel for moving the clamping spider into compressive relationship with the clutch parts. At the same time my fixture provides a centering or pilot plate for properly aligning the clutch and for adjusting the position of the clamping plate, pillow blocks or height pilot for predetermining the distance of compression, and gauging means for automatically aligning the position of the clutch actuating levers. I further contemplate the provision of the pillow blocks, pilot plates, and gauging or "flush plates" in a plurality of various sizes in order to accommodate different sizes and models of clutches.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

Figure 1:
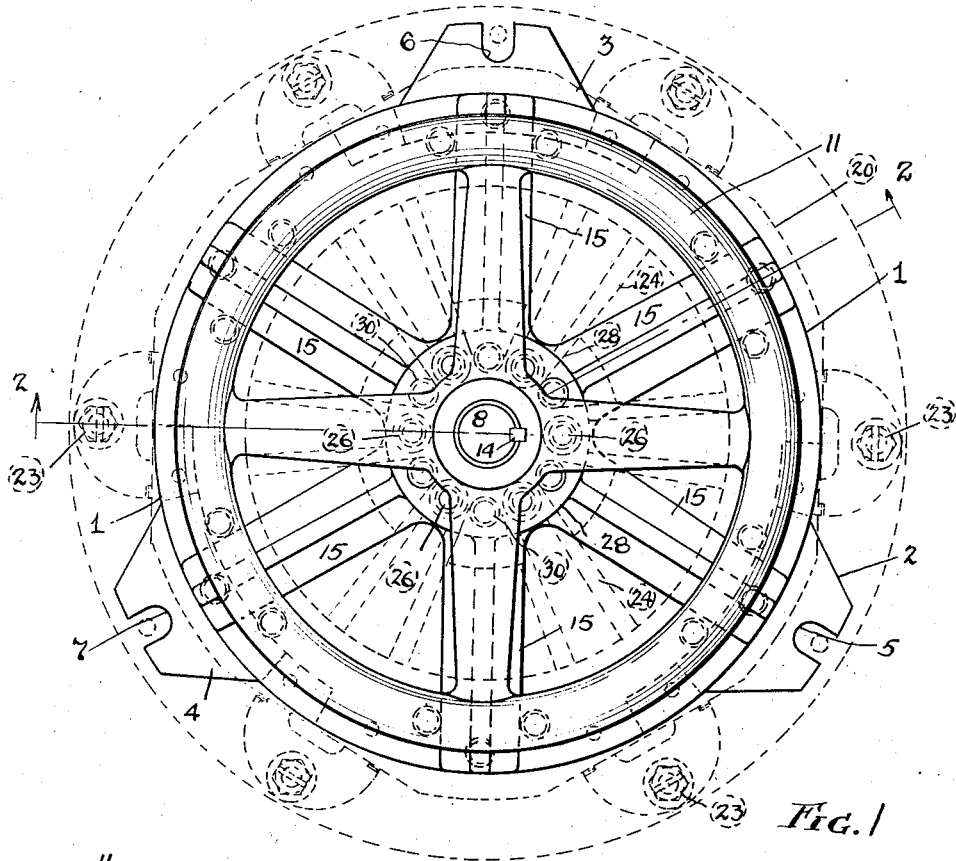
Figure 2:
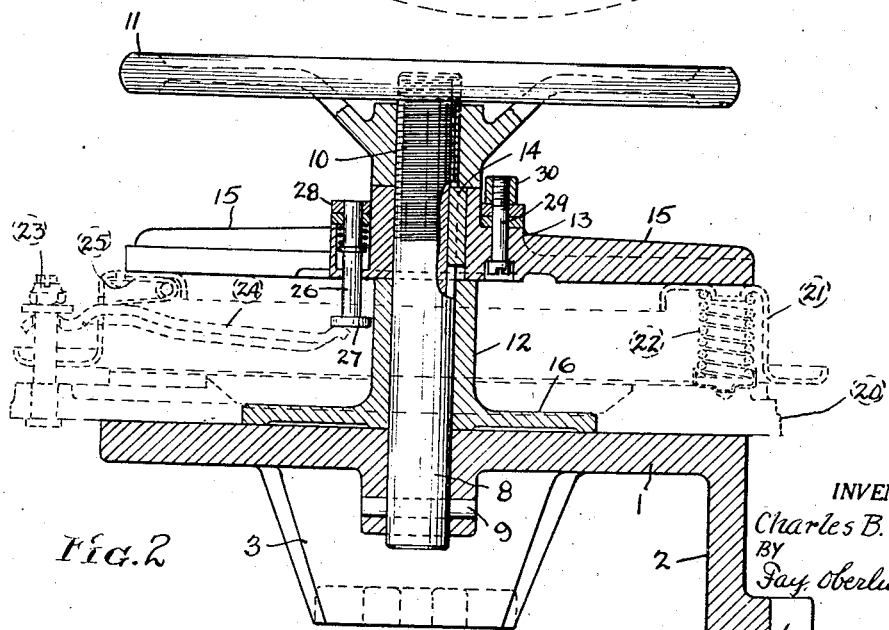

In said annexed drawings:

Fig. 1 is a plan view of the fixture, constructed according to the principle of my invention; and Fig. 2 is an elevational section taken along line 2—2, Fig. 1. Figs. 3 and 4 are elevational sectional views similar to Fig. 2, but illustrating alternative forms of construction.

Referring more particularly to Figs. 1 and 2, my device consists of the base plate 1 supported by the triple legs 2, 3 and 4. The latter supporting legs may have suitable slots 5, 6 and 7, respectively, for the reception of clamping bolts in order to secure the fixture to a bench. A vertical spindle 8 is rigidly secured to the center of the base plate 1 by means of a suitable dowel pin 9. The upper portion of the spindle 8 is threaded as indicated at 10 for engagement by the hand wheel 11. A pilot plate 12 is adapted to fit over the spindle 8 and to rest upon the upper surface of the base 1. Further functions of the pilot plate 12 will be hereinafter more fully described. A clamp plate 13 is slidably and non-rotatably keyed to the spindle 8 by means of the key-way 14 and possesses a plurality of radially extending arms 15 adapted to engage with the clutch assembly.

The clutch mechanism, which has been indicated in dotted line, consists of the pressure plate 20, the cover plates 21, the pressure spring 22 positioned between said pressure plate and cover plate, the actuating lever retaining studs 23, the actuating levers 24 and the anti-rattle springs 25. In assembling and adjusting, the above described clutch mechanism is placed with the pressure plate 20 resting upon the upper surface of the base 1. The radial flanges 16 of the pilot plate 12 interengage with the inside diameter of the pressure plate and serve to properly align and center the clutch mechanism in position on the fixture. The clamping spider 15 then is screwed down tight against the top of the pilot plate 12. The height of the sleeve of the pilot plate 12 is equivalent to that of the distance between the pressure plate 20 and cover plate 21 when the clutch mechanism is in complete disengagement. It might likewise be mentioned that the pillow blocks 36 as shown in the alternative construction of Fig. 3 may be substituted for the pilot plate 12 in the last described construction for the purpose of determining the distance of compression of the cover plate 21 using the same clamping and gauging means.

The hub portion of the clamping plate 13 carries a plurality of spring loaded plungers or flush pins 26 which have their lower ends 27 in registry with the inner ends of the actuating levers 24. A gauging plate 28 has a plurality of holes for the reception of the upper ends of the flush pins 26. This last named gauging plate 28 may be provided in a number of different thicknesses in order to accommodate various sizes of clutches. For the purpose of interchangeably securing the gauging plate 28 to the hub of the clamping plate 13, there are provided a number of studs 29 which are in turn adapted to be threadably engaged by the knurled thumb nuts 30.

It will thus be seen that when the clutch mechanism is properly clamped in the fixture, the actuating levers 24 will not be subjected to operating spring pressure and each flush pin 26 will indicate the relative positions of the said actuating levers 24 by the degree in which they extend or recede from the upper surface of the gauging plate 28. In order to secure a proper alignment and adjustment of the actuating levers 24, it is then a comparatively simple matter to adjust the nuts 23 until the top ends of all of the pins 26 are flush with the gauging plate 28.

In the alternative form of construction shown in Fig. 3, the form of the base plate has been slightly altered to that as indicated by the numeral 31. In this modified form of base plate 31 there is positioned a plurality of radially extending T-shaped slots 32 in which are adapted to be inserted the clamps 33 by means of the bolts 34 extending therethrough. The clamps 33 (only one of which is shown) carry the end screws 35 which are adapted to screw down the cover plate 21 against the pillow blocks 36. These pillow blocks 36 take the place of the vertical sleeve portion 12 of the pilot plate, so that only the disc portion 16 of the pilot plate need be employed in this last form of construction. For the purpose of adjusting the clutch actuating levers 24, a dial indicator 37 carried by the sleeve 38 is mounted upon the spindle 8. A threaded shaft 39 engaged by the thumb nut 40 serves as a means for adjusting the vertical position of the dial indicator 37. The dial indicator 37 has a contact plunger 41 to engage with the ends of the actuating levers 24.

In assembling new clutch parts by means of the last described form of fixture, the clutch to be repaired is first placed upon the fixture and then drawn down against the pillow blocks by means of the clamps. The indicator is then placed to register on the actuating levers and the indicator is adjusted in order to give a zero reading. The clutch is then removed, the old parts are replaced with new ones and the actuating levers then adjusted to the indicator.

In the alternative form of construction shown in Fig. 4 a solid ring 45 similar to an automobile fly wheel is positioned upon the base 46, and has a plurality of studs 47 for the purpose of holding in position the clutch cover plate 21, the remainder of the construction is similar to that above described and illustrated in Fig. 3.

The disassembly of the clutch mechanism is accomplished in substantially the above described manner except, of course, that the adjusting step is omitted.

In assembling the clutch under either method it is first placed on the fixture with the pressure plate 20 uppermost, then the springs 21 are compressed and the levers, studs and nuts assembled temporarily.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A device for servicing automotive clutches and the like having pressure springs and actuating levers, comprising the combination of means for simultaneously compressing said springs, and gauging means for indicating the alignment of said levers.

2. A device for servicing automotive clutches and the like having pressure springs and actuating levers, comprising the combination of means for simultaneously compressing said springs, and gauging means for indicating the relative axial positions of said levers when said clutch is in compressed position.

3. A device for servicing automotive clutches and the like having pressure springs and actuating levers, comprising the combination of means for simultaneously compressing said springs to a distance equivalent to complete disengagement of said clutch when in use, and gauging means for indicating the alignment of said levers.

4. A device for servicing automotive clutches and the like having pressure springs and actuating levers comprising the combination of means for simultaneously compressing said springs, and gauging means for indicating the relative axial positions of said levers when said clutch is in compressed position, and means for centering said clutch and limiting the movement of said compressing means.

5. A device for servicing automotive clutches and the like having pressure springs and actuating levers comprising the combination of means for simultaneously compressing said springs, and gauging means for indicating the relative axial positions of said levers when said clutch is in compressed position, and means for centering said clutch and limiting the movement of said compressing means, said centering means being interchangeable in various sizes for corresponding sizes of clutches.

6. A device for servicing automotive clutches and the like having pressure springs and actuating levers comprising the combination of means for simultaneously compressing said springs, and gauging means for indicating the alignment of said levers, said gauging means being interchangeable in various sizes for corresponding sizes of clutches.

7. A device of the character described comprising the combination of a base member, a vertical spindle mounted centrally thereof, a clutch centering means adapted to fit over said spindle, and means associated with the upper portion of said spindle for compressing the pressure springs of said clutch.

8. A device of the character described comprising the combination of a base member, a vertical spindle mounted centrally thereof, a clutch centering and height adjustment meons adapted to fit over said spindle, and means associated with the upper portion of said spindle for compressing the pressure springs of said clutch.

9. A device of the character described comprising the combination of a base member, a vertical spindle mounted centrally thereof, a clutch centering means adapted to fit over said spindle, means associated with the upper portion of said spindle for compressing the pressure springs of said clutch, and means for indicating the relative axial positions of the actuating levers of said clutch when in compressed position.

10. A device of the character described comprising the combination of a base member, a vertical spindle mounted centrally thereof, a clutch centering means adapted to fit over said spindle, a hand wheel threadably engaging said spindle, radially extending clamping means actuated by said hand wheel and non-rotatably mounted on said spindle for compressing the pressure springs of said clutch, and means for indicating the relative axial positions of the actuating levers of said clutch when in compressed position.

11. A device of the character described comprising the combination of a base member, a vertical spindle mounted centrally thereof, a clutch centering means adapted to fit over said spindle, a hand wheel threadably engaging said spindle, radially extending clamping means actuated by said hand wheel and non-rotatably mounted on said spindle for compressing the pressure springs of said clutch, and spring loaded plungers passing through the hub of said clamping means and having their lower ends in registry with the inner ends of the actuating levers of said clutch.

12. A device of the character described comprising the combination of a base member, a vertical spindle mounted centrally thereof, a clutch centering means adapted to fit over said spindle, a hand wheel threadably engaging said spindle, radially extending clamping means actuated by said hand wheel and non-rotatably mounted on said spindle for compressing the pressure springs of said clutch, spring loaded plungers passing through the hub of said clamping means and having their lower ends in registry with the inner ends of the actuating levers of said clutch, and interchangeable gauging plates to be positioned on said clamping means for indicating the alignment of said plungers.

Signed by me, this 25th day of October, 1931.

CHARLES B. SPASE.